United States Patent
Harding et al.

(10) Patent No.: US 7,536,496 B2
(45) Date of Patent: May 19, 2009

(54) METHOD AND APPARATUS FOR TRANSMITTING DATA IN AN INTEGRATED CIRCUIT

(75) Inventors: W. Riyon Harding, Richmond, VT (US); David W. Milton, Underhill, VT (US); Clarence Rosser Ogilvie, Huntington, VT (US); Jason E. Rotella, Mineville, NY (US); Paul M. Schanely, Essex Junction, VT (US); Sebastian T. Ventrone, South Burlington, VT (US)

(73) Assignee: International Business Machines Corporation, Armonk, NY (US)

( * ) Notice: Subject to any disclaimer, the term of this patent is extended or adjusted under 35 U.S.C. 154(b) by 240 days.

(21) Appl. No.: 11/276,449

(22) Filed: Feb. 28, 2006

(65) Prior Publication Data

US 2007/0204094 A1 Aug. 30, 2007

(51) Int. Cl.
*G06F 13/00* (2006.01)
*G06F 13/42* (2006.01)
*G06F 13/362* (2006.01)
*H04L 12/28* (2006.01)
*H04L 12/56* (2006.01)
*H03K 17/00* (2006.01)

(52) U.S. Cl. .................. 710/316; 710/106; 710/113; 370/389; 340/2.1

(58) Field of Classification Search ................ 710/105, 710/316, 106, 113; 709/238–244; 712/10–12, 712/29; 340/2.1, 2.23; 370/389
See application file for complete search history.

(56) References Cited

U.S. PATENT DOCUMENTS 4,862,461 A * 8/1989 Blaner .................. 714/749
4,887,259 A 12/1989 Morita
5,317,566 A 5/1994 Joshi
6,275,975 B1 * 8/2001 Lambrecht et al. ............. 716/14
6,289,096 B1 * 9/2001 Suzuki .................. 379/221.01
7,096,251 B2 * 8/2006 Chiu et al. .................. 709/202
7,133,929 B1 * 11/2006 Shah .......................... 709/241
2001/0033556 A1 * 10/2001 Krishnamurthy et al. .... 370/329
2001/0055323 A1 12/2001 Rowett et al.
2002/0006112 A1 1/2002 Jaber et al.
2003/0154324 A1 * 8/2003 Harding et al. ................ 710/1
2004/0029553 A1 * 2/2004 Cain .......................... 455/403
2004/0062248 A1 * 4/2004 Nagarajan et al. ........... 370/394
2004/0233855 A1 * 11/2004 Gutierrez et al. ............ 370/252
2005/0122955 A1 * 6/2005 Lin et al. .................... 370/351
2006/0256768 A1 * 11/2006 Chan .......................... 370/351

(Continued)

FOREIGN PATENT DOCUMENTS

WO WO 2006098723 A1 * 9/2006

OTHER PUBLICATIONS

Newton, Harry. "Newton's Telecom Dictionary". Entry 'header'. Mar. 2003. CMP Books. p. 377. ISBN 1-57820-307-4.*

(Continued)

*Primary Examiner*—Thomas J Cleary
(74) *Attorney, Agent, or Firm*—Richard M. Kotulak (57) ABSTRACT

A method and apparatus for transmitting data between cores residing in an integrated circuit. Data is transmitted by using hubs located between the cores and an arbiter. The arbiter maintains a table that contains all the valid combinations of routing paths between the cores.

1 Claim, 7 Drawing Sheets

U.S. PATENT DOCUMENTS

2006/0262779 A1* 11/2006 Courchesne et al. ........ 370/360
2007/0171890 A1* 7/2007 Walter et al. ................ 370/352

OTHER PUBLICATIONS

Mueller, Stephen et al. "Analysis of a Distributed Algorithm to Determine Multiple Routes with Path Diversity in Ad Hoc Networks". pp. 1-9.*

Baratz, Alan E. et al. "SNA Networks of Small Systems". IEEE Journal on Selected Areas in Communications. vol. SAC-3, No. 3. May 1985. IEEE. pp. 416-426. 0733-8716/85/0500-0416.*

Galles, Mike. "Spider: A High-Speed Network Interconnect". IEEE Micro. Jan./Feb. 1997. IEEE. pp. 34-39. 0272-1732/97.*

"Tom Sheldon's Linktionary.com". Entry 'Source Routing'. 2001. Tom Sheldon and Big Sur Multimedia. Retrieved from internet Jan. 29, 2008. <http://www.linktionary.com/s/source_routing.html>.*

Krishnan, Ram et al. "An Approach to Path-Splitting in Multipath Networks". 1993. IEEE. pp. 1353-1357. 0-7801-0950-2/93.*

Perkins, Charles E. et al. "Highly Dynamic Destination-Sequenced Distance-Vector Routing (DSDV) for Mobile Computers". ACM SIGCOMM 94, London, England, UK. 1994. Association of Computing Machinery. pp. 234-244. 0-89791-682-4/94/0008.*

Ghazizadeh, Shayan et al. "Security-Aware Adaptive Dynamic Source Routing Protocol". Procedings of the 27th Annual IEEE Conference on Local Computer Networks (LCN'02). 2002. IEEE. pp. 1-10. 0742-1303/02.*

"Vector Routing". XRoads Networks—White Paper. Sep. 2001. XRoads Networks. pp. 1-7.*

Garcia-Luna-Aceves, J.J. et al. "Source-Tree Routing in Wireless Networks". pp. 1-10.*

Roy, Siuli et al. "A Network-Aware MAC and Routing Protocol for Efective Load Balancing in Ad Hoc Wireless Networks with Directional Antenna". ACM Mobihoc '03, Annapolis, Maryland, USA. Jun. 1-3, 2003. ACM. pp. 1-10. 1-58113-684-06/03/0006.*

* cited by examiner

| Identification | Time |
|---|---|
| Core A | |
| Hub 1 | |
| Hub 2 | |
| Hub 3 | |
| Hub 4 | |
| Hub 8 | |
| Core B | |

| Identification | Time |
|---|---|
| Core A | |
| Hub 1 | 0.007 |
| Hub 2 | 0.003 |
| Hub 3 | 0.005 |
| Hub 4 | 0.008 |
| Hub 8 | 0.010 |
| Core B | 0.033 |

*Figure 5*

| Source to Destination ID | Path | Time | Rank |
|---|---|---|---|
| A-B | 1, 2, 3, 4, 8 | 0.033 | 1 |
| A-B | 1, 5, 8 | 0.055 | 2 |
| A-B | 1, 6, 7, 8 | 0.056 | 3 |
| D-C | 6, 7 | 0.012 | 1 |
| D-C | 6, 5, 8, 7 | 0.025 | 2 |
| | | | |
| | | | |

| Source to Destination ID | Path | Time | Rank |
|---|---|---|---|
| A-B | 1, 5, 8 | 0.017 | 1 |
| A-B | 1, 2, 3, 4, 8 | 0.028 | 2 |
| A-B | 1, 6, 7, 8 | 0.056 | 3 |
| D-C | 6, 7 | 0.012 | 1 |
| D-C | 6, 5, 8, 7 | 0.025 | 2 |
| | | | |
| | | | |

METHOD AND APPARATUS FOR TRANSMITTING DATA IN AN INTEGRATED CIRCUIT

BACKGROUND

1. Technical Field of the Present Invention

The present invention generally relates to integrated circuits and, more specifically, to the communication of data between cores that reside in an integrated circuit.

2. Description of Related Art

As manufacturing processes continue to become more complex and of smaller geometries, error-free communication of data between functional cores of an integrated circuit without introducing additional problems from noise, available space, and other similar issues is becoming increasingly difficult. Current methods for providing this communicated data use point-to-point or similar wiring techniques such as shared buses. Unfortunately, as integration density continues to increase, these techniques are becoming inefficient and prone to the introduction of errors.

It would, therefore, be a distinct advantage to have a method and apparatus that could transfer data from one core to another while reducing the issues typically associated with point-to-point wiring techniques and the like.

SUMMARY OF THE PRESENT INVENTION

In one aspect, the present invention is a method of transmitting data in an integrated circuit. The method includes the steps of creating multiple cores that implement a desired function and creating multiple hubs that transmit data between the cores. The method further includes the step of creating a table that contains all valid path routings for data to travel from a source core of the multiple cores to a destination core of the multiple cores using one or more of the hubs. The method also includes the step of selecting one of the valid path routings for transmitting data from a first source core to a first destination core. In addition, the method also includes the step of transmitting the data according to the selected path routing from the first source core to the first destination core.

BRIEF DESCRIPTION OF THE DRAWINGS

The present invention will be better understood and its advantages will become more apparent to those skilled in the art by reference to the following drawings, in conjunction with the accompanying specification, in which.

DETAILED DESCRIPTION OF THE PREFERRED EMBODIMENT OF THE PRESENT INVENTION

The present invention is a method and apparatus for transmitting data between cores in an integrated circuit using hubs/routers that are coupled one to another. The data is segmented into data packets and transmitted from a source core to a destination core. Each data packet includes a header for specifying its path route from the source core to the destination core and the time spent at hub/routers. This information is centrally maintained and updated in an arbiter that organizes the information according to source to destination path and time. Prior to transmitting data, the source core queries the arbiter to determine which of the available paths is appropriate for the transmission.

Figure 1:
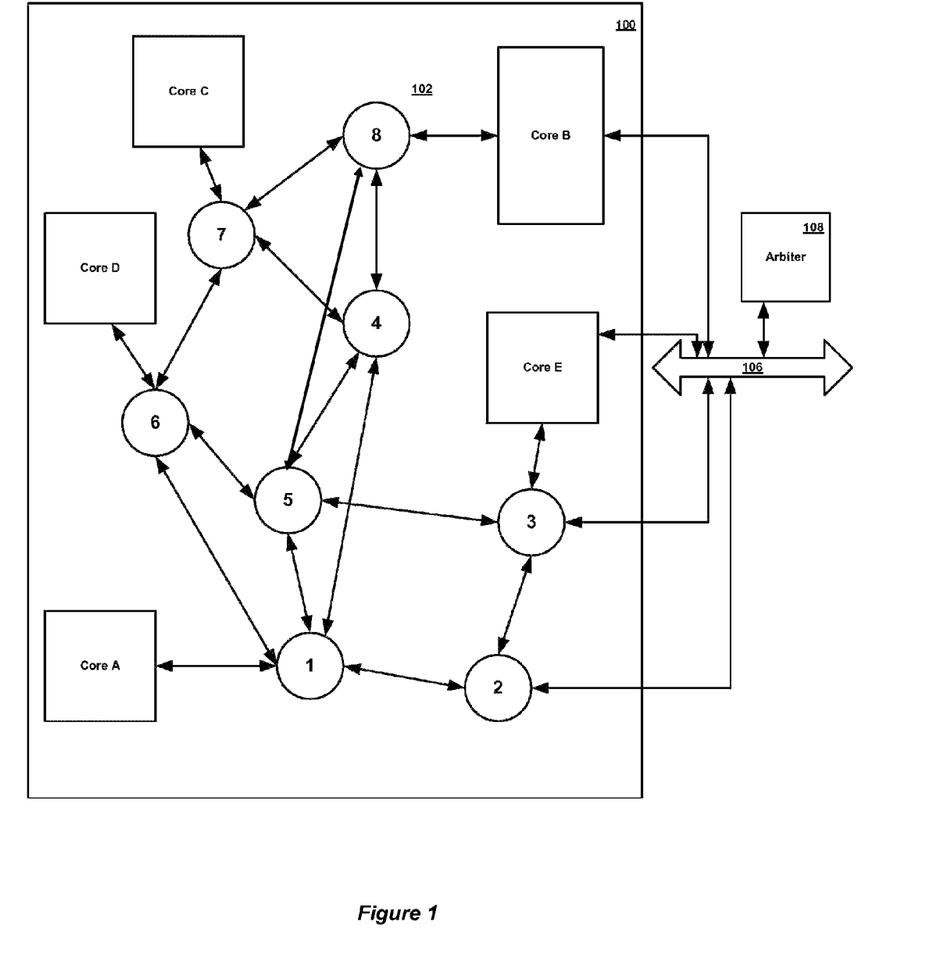
FIG. 1 is a diagram of an integrated circuit that implements a communication system of a preferred embodiment of the present invention.

Reference now being made to FIG. 1, a diagram of an integrated circuit 100 is shown that implements a communication system 102 of a preferred embodiment of the present invention. The communication system 102 includes a plurality of cores A-E, an arbiter 108, arbiter bus 106, and hubs/routers 1-8. In order to simplify the ease with which the present invention can be understood and explained, a limited number of cores and hubs have been illustrated. In practice, the number of cores and hubs would be numerous and dependent upon the particular design being implemented.

Each one of the hubs 1-8 is coupled to another hub 1-8 or core A-E in such a fashion so as to provide communication of data between cores A-E in accordance with transfer timing (e.g., synchronous or asynchronous) and design constraints. In addition, each of the hubs 1-8 and cores A-E communicate with the arbiter 108 using the arbiter bus 106 (each core A-E is coupled to the arbiter bus 106) as described in connection with FIG. 2 below.

Figure 2:
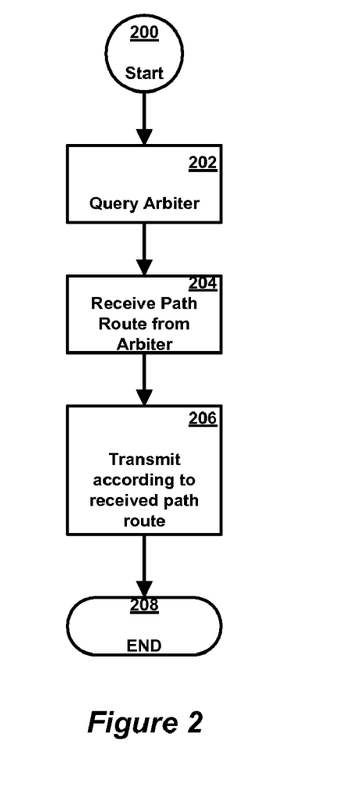
FIG. 2 is a flow chart illustrating the method for transmitting data from a source core to a destination core of FIG. 1 according to the teachings of a preferred embodiment of the present invention.

Reference now being made to FIG. 2 a flow chart is shown illustrating the method for transmitting data from a source core to a destination core of FIG. 1 according to the teachings of a preferred embodiment of the present invention. The transmission of data from a source core (e.g., Core A) to a destination core (e.g., Core B) can take several different paths (e.g., hubs (1=>5=>8), (1=>5=>4=>8), (1=>6=>7=>8), (1=>2=>4=>8), etc.). Some of these paths can be congested or otherwise unavailable.

Prior to transmitting data packets, the source core will query the arbiter 108 for a routing path to the destination core (Steps 200-202). The arbiter 108 is responsible for storing the potential paths for transmission of data from any one of the cores A-E to another core A-E and updating the time it takes for the data to actually travel one of these paths in real time as explained in connection with FIG. 4.

Figure 3:
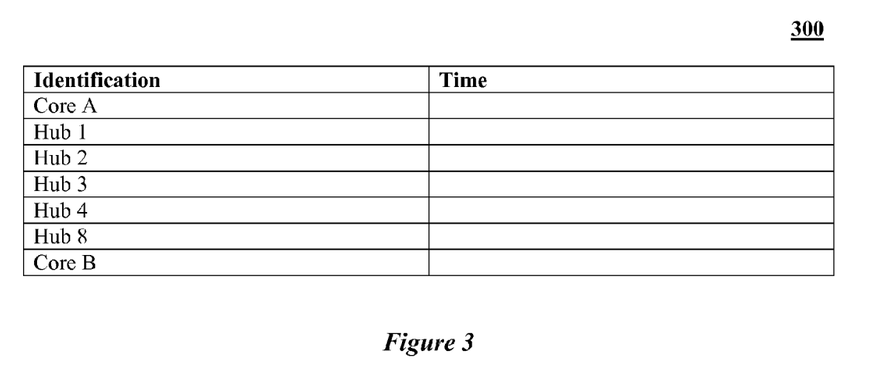
FIG. 3 is a data structure illustrating an example of how a header of a data packet can be constructed according to the teachings of the preferred embodiment of the present invention.

Based upon certain criteria such as time to reach the destination core and priority, the arbiter 108 upon receiving this request will return the routing path in the form of a header such as the example header 300 illustrated in FIG. 3 (Step 204). The header 300 includes the path the data packet should take from source core A to destination core B. In this example, the routing path is hubs 1, 2, 3, 4, and 8.

In the preferred embodiment of the present invention, as the data packet travels from one hub to another, the time spent at the hub is recorded in the header of the data packet. Alternatively, the total time it takes for the transmission of the data packet from the source core to the destination core can be stored on any other means for indicating the relative congestion of the routing path.

In accordance with the preferred embodiment of the present invention, the header 300 includes a time storage location with each hub designation. In this case, since the transmission of the header is just beginning, the time storage fields are blank or otherwise initialized.

Upon receiving the path route, the source core A, generates data packets containing the header 200 and transmits them to hub 1 (Steps 206-208) where they are further transmitted according to the indicated routing path.

Figure 4:
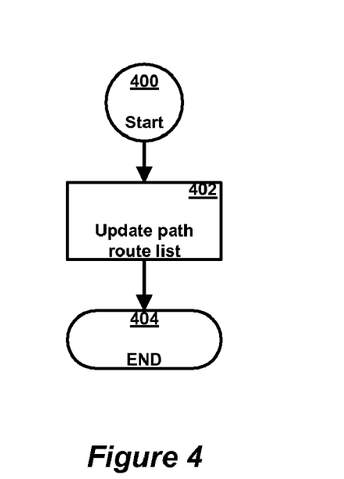
FIG. 4 is a flow chart illustrating the method used by the arbiter and a destination hub of FIG. 1 to store relevant transmission history information according to the preferred embodiment of the present invention.
Figure 5:
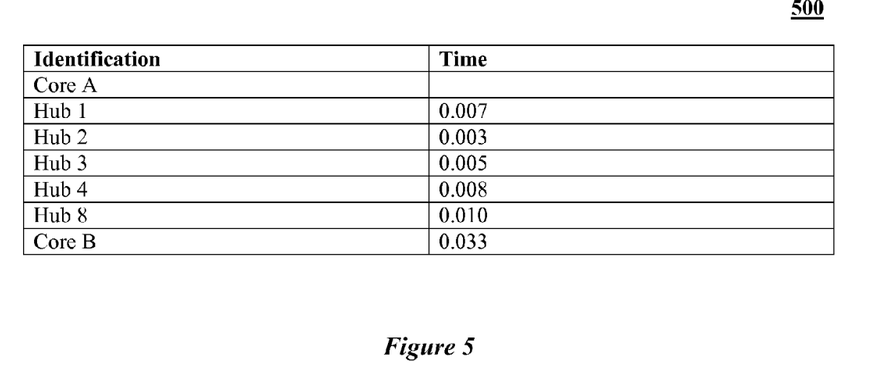
FIG. 5 is a data structure illustrating the header example of FIG. 3 updated to reflect the time spent at certain hubs of FIG. 1 during its transmission according to the teachings of the preferred embodiment of the present invention.

Reference now being made to FIG. 4, a flow chart is shown illustrating the method used by the arbiter 108 and a destination core of FIG. 1 to store relevant transmission history information according to the preferred embodiment of the present invention. When a destination core receives a data packet from an adjacent hub, it transmits the header 200 information to the arbiter 108 with an indication of the time spent at each hub or the total transmission time for the indicated path route (Step 400). In the present example, the header of a received data packet can take the form of header 500 of FIG. 5. Header 500 represents header 300 updated to include the time spent at each of the hubs as shown. For instance, the data packet spent 0.007 seconds at hub 1 and 0.010 seconds at hub 8 with a total time of transmission of 0.033 seconds.

Figure 6:
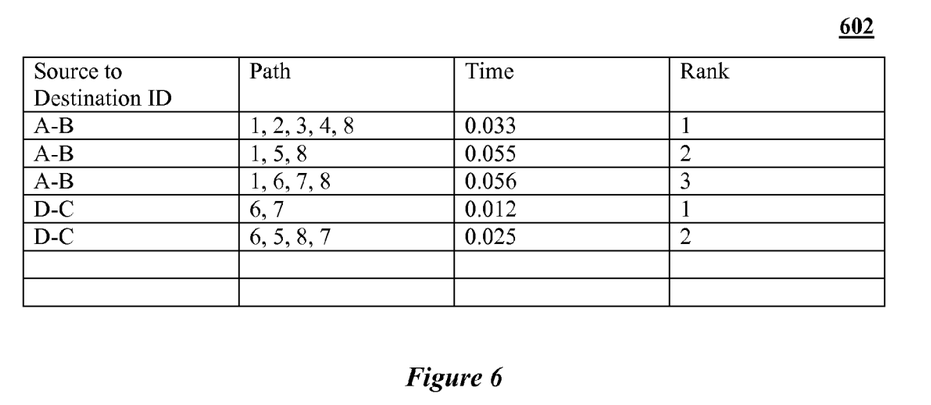
FIG. 6 is a diagram illustrating a table that is used by the arbiter of FIG. 1 for saving path routing information received from a destination core according to the teachings of the preferred embodiment of the present invention.

Reference now being made to FIG. 6, a diagram is shown illustrating a table 602 that is used by the arbiter 108 of FIG. 1 for saving path routing information received from a destination core according to the teachings of the preferred embodiment of the present invention. In the preferred embodiment of the present invention, the arbiter 108 includes memory (not shown) that can be used to store the table 602 that includes a source to destination field, a path field, a time field, and a rank field.

The source to destination field indicates the source core and destination core. The path field indicates the hubs (i.e., routing path) that the data packets will take when being transmitted to the destination core. The time field indicates the last recorded amount of time that a data packet following the indicated routing path took to reach the destination core from the source core. The rank field is used for indicating the relative rank of this row in the table 600 when compared to other rows having the same source and destination combination. In lieu of a rank field, the table 600 could be indexed on the time and source to destination field.

The table 600 includes all combinations for hub routing for any source to any destination core (not shown). As the destination cores provide the header information to the arbiter 108, the arbiter 108 updates the matching record (row) to reflect the new time and reset the ranks accordingly.

Figure 7:
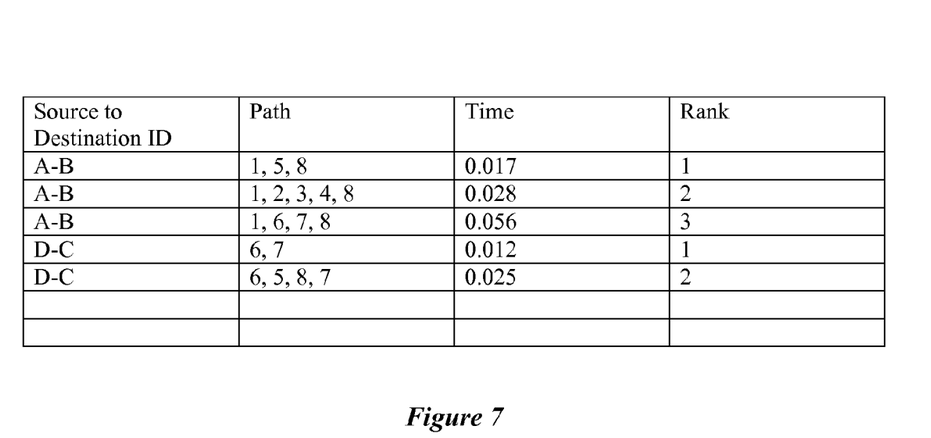
FIG. 7 is a diagram illustrating the updating of the table of FIG. 6 to reflect path routing information according to the teachings of the preferred embodiment of the present invention.

As an example, the table 600 indicates that for source core A to destination core B the fastest routing path is hubs 1, 2, 3, 4, and 8 via its rank. As time progresses, the table 600 could be updated as indicated in FIG. 7 to represent the data packets and sorted accordingly.

It should be noted that although the preferred embodiment uses a table with rows and columns, that any suitable data structure technique (e.g., link lists) could be used to track the fields noted above so that they can be accessed quickly and indexed appropriately.

The scheme used for determining which one of the path routing records to provide in response to a request for a particular source core and destination core can depend upon such things as hubs along the route path being available to transmit the packet data. If one or more of the hubs in the highest rank record for the route path indicate source to destination are unavailable, then the arbiter 108 selects the next highest rank record for this source to destination combination until it finds one that has the hubs available for this transaction.

The transmission of data packets from a source core to the indicated routing path provided by the arbiter 108 is explained below.

Figure 8:
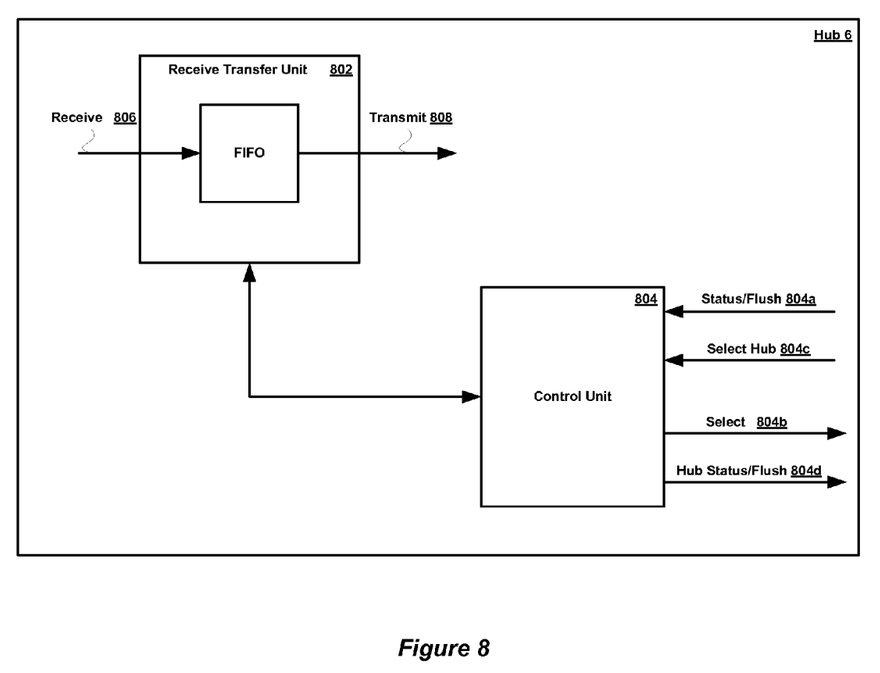
FIG. 8 is a schematic diagram illustrating in greater detail a selected hub of FIG. 1 according to the teachings of the preferred embodiment of the present invention.

Reference now being made to FIG. 8, a schematic diagram is shown illustrating in greater detail the hub 6 of FIG. 1 according to the teachings of the preferred embodiment of the present invention. Hubs 1-8 are structurally equivalent one to another, and therefore, the discussion with respect to hub 6 is equally applicable to hubs 1-8. Hub 6 includes a receive/transfer unit 802 and a control unit 804.

The receive/transfer unit 802 receives, stores and transmits data packets from other adjacent hubs and cores via receive and transmit data lines 806 and 808, respectively. Data packets are stored in the First In First Out (FIFO) memory mechanism as they are received and stored until they are either discarded or transmitted.

Figure 9:
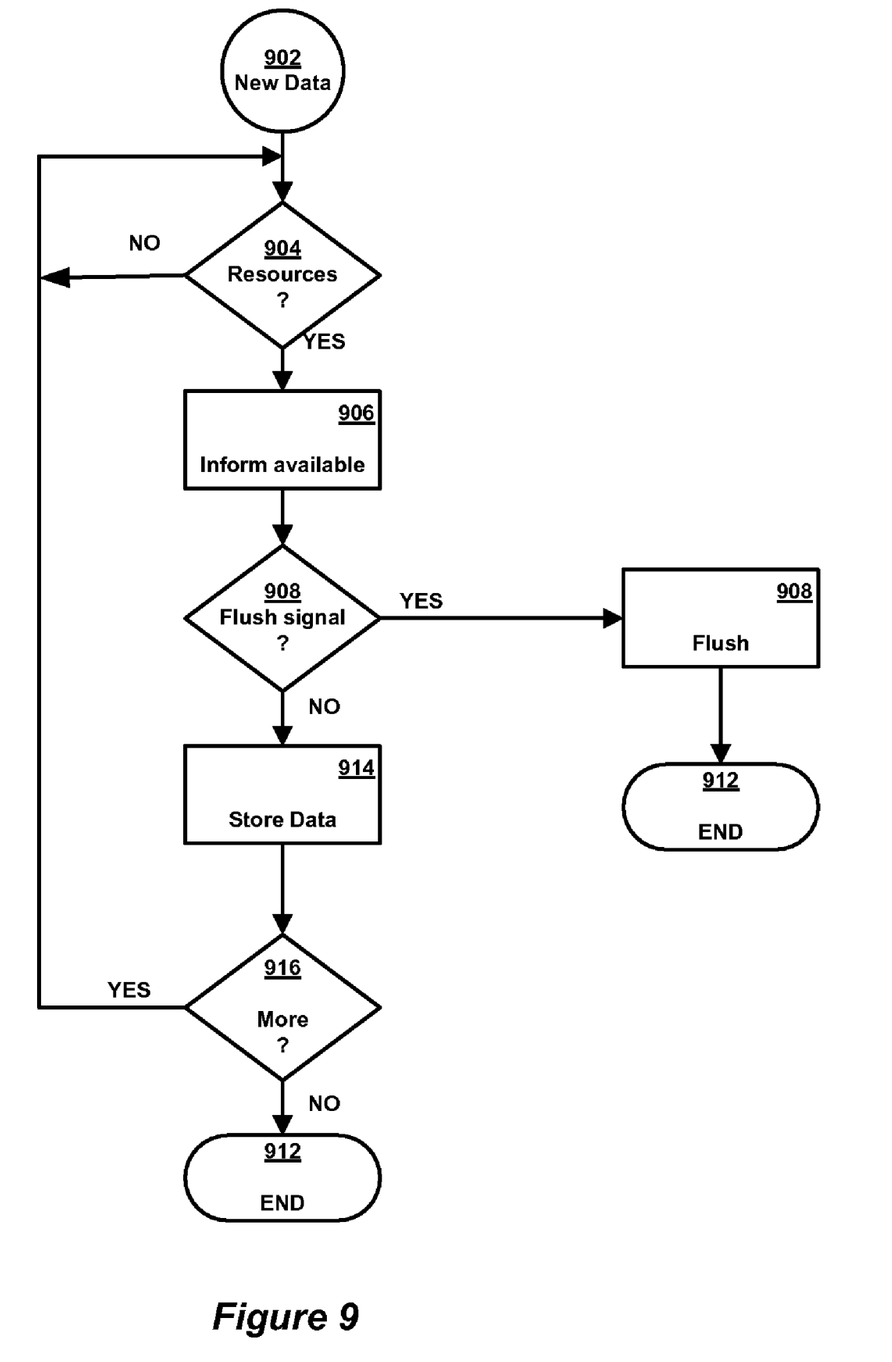
FIG. 9 is a flow chart illustrating the method used by a hub such as the selected hub of FIG. 8 for receiving packet data from another hub or core according to the teachings of the preferred embodiment of the present invention.

Control unit 804 manages the receipt and transmission of packet data by the receive/transfer unit 802 according to signals status/flush 804*a*, select hub 804*c*, select 804*b*, and hub status/flush 804*d* in accordance with the flow chart of FIG. 9.

Reference now being made to FIG. 9, a flow chart is shown illustrating the method used by a hub such as hub 6 of FIG. 1 for receiving packet data from an adjacent hub or core according to the teachings of the preferred embodiment of the present invention. Continuing with the explanation of hub 6, the receipt of data packets by hub 6 begins when an adjacent hub or source core asserts the hub select signal 804*c* (Step 902). The control unit 804 verifies that the FIFO of the receive/transfer unit 802 has sufficient resources to receive the incoming packet data (Step 904).

If there are insufficient resources the control unit 804 notifies the adjacent hub or source core that hub 6 is currently busy via hub status/flush signal 804*d*. If sufficient resources exist then the control unit 804 notifies the adjacent hub or source core to transmit data packets (Step 906)

In the preferred embodiment of the present invention, a hub or source core can simultaneously transmit multiple copies of the data when transmission is considered critical. When a hub or source core initiates multiple instantiations of the same data packets, unique identifiers are included in the header to indicate the instantiation to which the data packet belongs and that there are multiple instantiations. As a destination core receives a data packet, it records this information until the data transmission has been completed.

As explained below in connection with the receipt of data packets by a destination core, the destination core provides the headers of received data packets to the arbiter 108. The arbiter 108 tracks when multiple instances of the same data is being transmitted, and upon receiving header information on the data packets for the first instance to reach the destination core, the arbiter 108 informs all other hubs that are holding or transmitting the other instance(s) to flush their FIFOs of these redundant data packet instances via the status/flush signal 804a (Steps 906-908, and 918).

Received data packets are stored in the FIFO (Step 914). If the select hub signal 804c is still selected, then the source core or adjacent hub desires to send more packet data and the receipt of packet data proceeds back to step 302 and repeats the method from that point; otherwise, the receipt of the packet data ends (Step 918).

Figure 10:
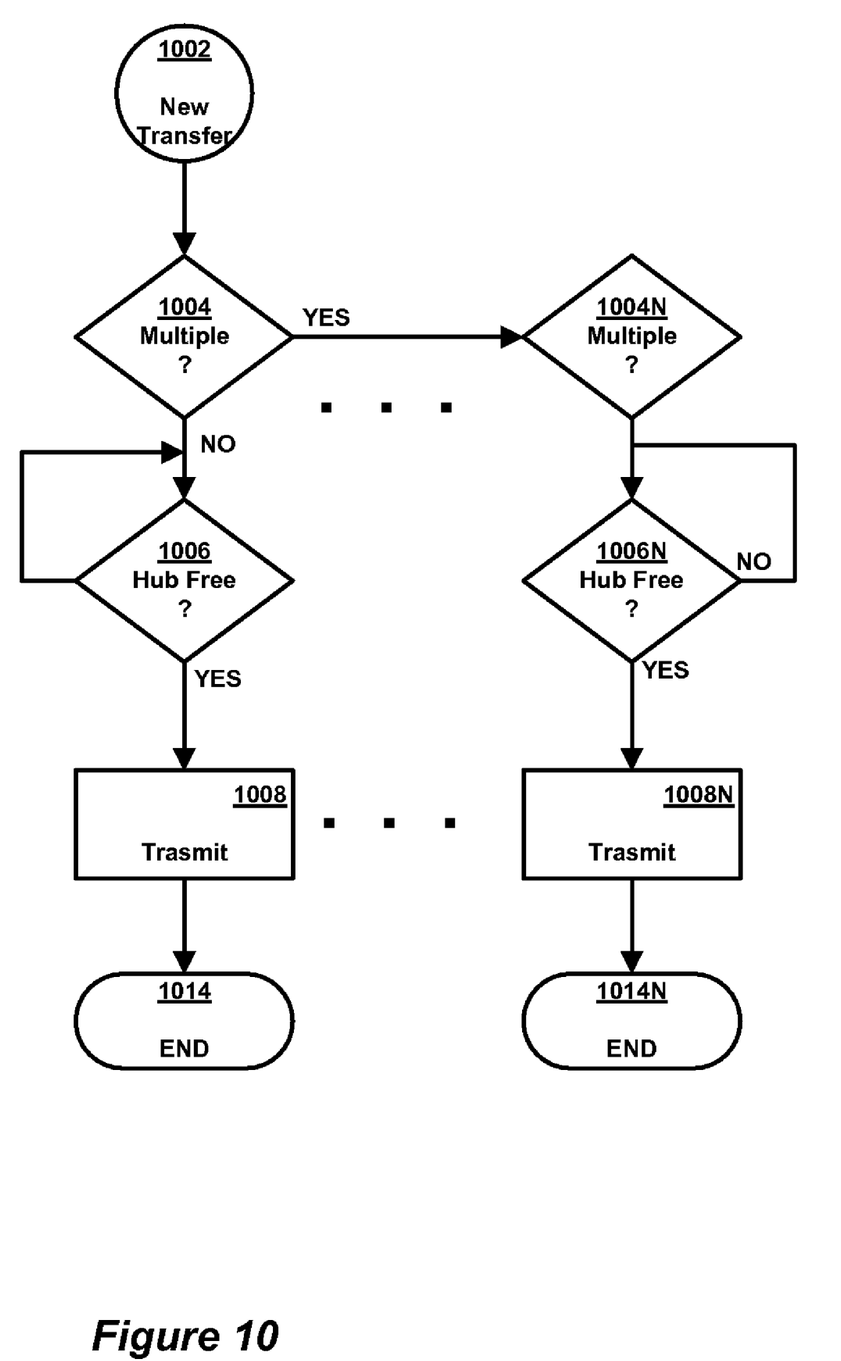
FIG. 10 is a flow chart illustrating the transmission of data packets by a hub of FIG. 1 according to the teachings of a preferred embodiment of the present invention.

Reference now being made to FIG. 10, a flow chart is shown illustrating the transmission of data packets by a hub of FIG. 1 according to the teachings of a preferred embodiment of the present invention. The control unit 804 processes any data packets stored in the FIFO according to any priorities that can be indicated in the headers of the data packets.

As previously discussed, the arbiter 108 can inform the hub that when it receives a certain data packet as identified with header information that the data packet should be transmitted to multiple adjacent hubs (Step 404).

The control unit 804 checks whether an adjacent hub is available for receipt of data packets by asserting the status/flush signal 804d (406-n). If the status/flush signal 804a indicates that the adjacent hub is available then the control unit 804 instructs the receive/transfer unit 802 to transmit the data packets in the FIFO (Steps 1012-1014).

If the status/flush signal 804a indicates that the adjacent hub is busy then the control unit 804 waits a predetermined period of time and attempts the transmission again (Step 1006)

It should be noted, that as the transmission of the data packets is proceeding that if this was part of a multiple instantiation that a flush signal can be received from the arbiter 108 via the status/flush signal 804a. If a flush signal is received the control unit 804 instructs the receive/transfer unit 802 to flush the indicated data packets stored in the FIFO.

It is thus believed that the operation and construction of the present invention will be apparent from the foregoing description. While the method and system shown and described has been characterized as being preferred, it will be readily apparent that various changes and/or modifications could be made without departing from the spirit and scope of the present invention as defined in the following claims.

What is claimed is:

1. A method of transmitting data in an integrated circuit, the method comprising the steps of:

creating multiple cores that implement a desired function;
creating multiple hubs that simultaneously transmit a plurality of redundant data packets between the cores, the multiple hubs each comprising at least one FIFO, the plurality of redundant data packets each comprising a copy of data to be transferred, and a header;
the header comprises a unique identifier, and a means for recording timing information, the timing information comprises the time a data packet is stored in the FIFO;
creating a table in an arbiter that contains all valid path routings and timing information for the data packets to travel from a source core to one or more destination cores using one or more of the hubs, the arbiter residing in a location separate from the hubs, the source core being any one of the multiple cores from which the data packet originates and the destination cores being any one or more of the multiple cores to which the data packet is intended to be transferred;
transmitting a request from the source core to the arbiter to transmit data from the source core to one or more of the destination cores;
selecting, from the table, one or more of the valid path routings for transmitting the data packets from the source core to one or more of the destination cores;
sending the selected path routings from the arbiter to the source core;
generating the plurality of redundant data packets and populating header information in each of the redundant data packets which corresponds to the selected path routing and the unique identifier;
simultaneously transmitting the plurality of redundant data packets according to their selected path routings from the source core to one or more of the hubs or the destination core;
recording the unique identifier and the timing information when the data packet is received in the destination core, and sending the unique identifier and the timing information to the arbiter;
identifying when a first of the plurality of redundant data packets is received by one or more of the destination cores;
flushing each of the FIFOs which are storing or transmitting the redundant data packets via a status/flush signal from the arbiter; and
updating the table according to a predetermined prioritization scheme using the timing information provided by the destination cores.

* * * * *